April 7, 1959 W. PEARLMAN 2,881,426
VERTICAL ANTENNA MEASURING RANGE
Filed Oct. 21, 1955 4 Sheets-Sheet 1

INVENTOR
W. PEARLMAN

BY
ATTORNEYS

April 7, 1959 W. PEARLMAN 2,881,426
VERTICAL ANTENNA MEASURING RANGE
Filed Oct. 21, 1955 4 Sheets-Sheet 2
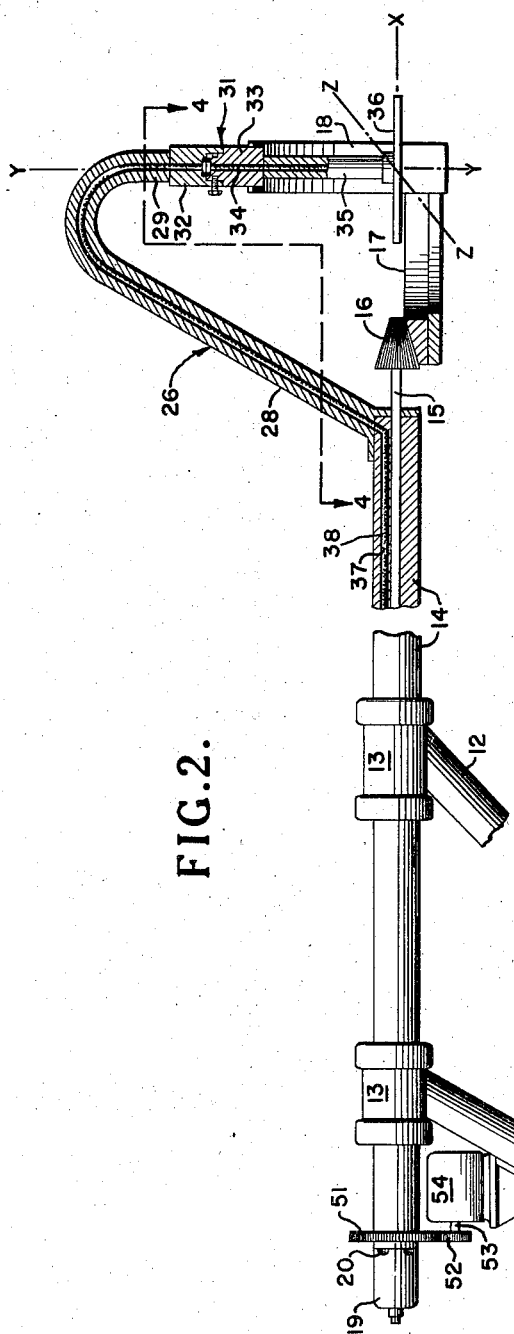
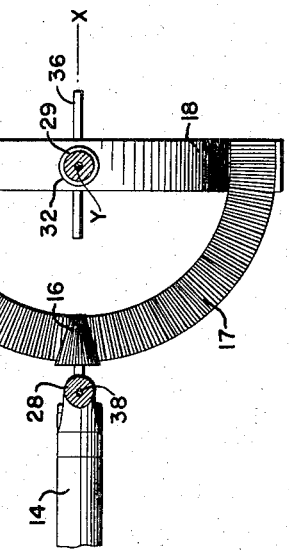
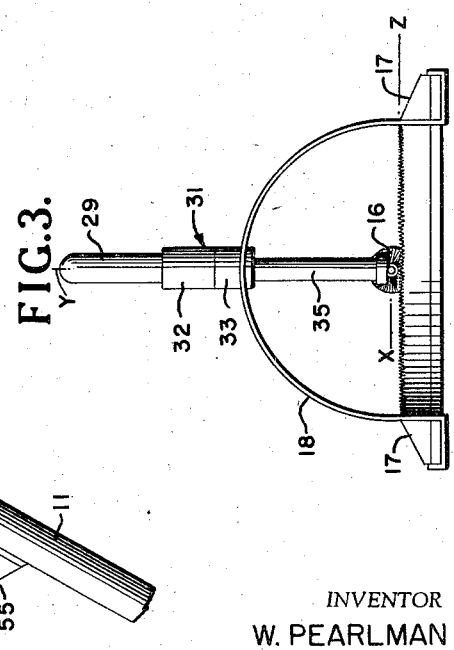
INVENTOR
W. PEARLMAN April 7, 1959 W. PEARLMAN 2,881,426
VERTICAL ANTENNA MEASURING RANGE
Filed Oct. 21, 1955 4 Sheets-Sheet 3

INVENTOR
W. PEARLMAN

BY
ATTORNEYS

April 7, 1959  W. PEARLMAN  2,881,426
VERTICAL ANTENNA MEASURING RANGE
Filed Oct. 21, 1955  4 Sheets-Sheet 4

INVENTOR
W. PEARLMAN
BY
ATTORNEYS

United States Patent Office 2,881,426
Patented Apr. 7, 1959

2,881,426

VERTICAL ANTENNA MEASURING RANGE

William Pearlman, Philadelphia, Pa., assignor to the United States of America as represented by the Secretary of the Navy Application October 21, 1955, Serial No. 542,120

9 Claims. (Cl. 343—100)

(Granted under Title 35, U. S. Code (1952), sec. 266)

The invention described herein may be manufactured and used by or for the Government of the United States of America for governmental purposes without the payment of any royalties thereon or therefor.

The present invention relates to a testing device and more particularly to a new and improved antenna testing device including control means for rotatably moving the antenna under test to various selected positions whereby the free space radiation patterns of the antenna operating in a very high frequency range may be made manifest. Furthermore, the invention provides new and improved means for preventing entanglement of the R.-F. energy feed cable with the antenna supporting and rotating structure during operation of the device and testing of the antenna, reducing the R.-F. pick-up from the feeder line to a negligible degree, determining the magnitude of the R.-F. pick-up should such a condition exist and for eliminating ground reflections and reducing spurious reflections to a minimum.

An object of the present invention is to provide a new and improved antenna testing device.

Another object of the invention is the provision of an apparatus for controlling automatically the various movements of an antenna under test whereby the free space radiation patterns of the antenna operating in a high frequency range may be made manifest.

Still another object of the invention is the provision of an antenna testing apparatus wherein means are provided for eliminating ground reflections and reducing spurious reflections to a minimum during a testing operation.

A further object of the invention is the provision of a standard for supporting a test model or antenna wherein the model or antenna, as the case may be, can be rotated about three mutually perpendicular axes.

A still further object of the invention is the provision of an antenna test range wherein orientation of the antenna under test may be either horizontal or vertical as required during testing operations.

Other objects and many of the attendant advantages of this invention will be readily appreciated as the same becomes better understood by reference to the following detailed description when considered in connection with the accompanying drawings wherein:

Fig. 2 is an enlarged fragmentary elevational view of the device of Fig. 1, partially broken away and partially in section;

Fig. 3 is an end view of the device of Fig. 2;

Fig. 4 is a sectional view taken on the line 4—4 of Fig. 2;

Figure 1:
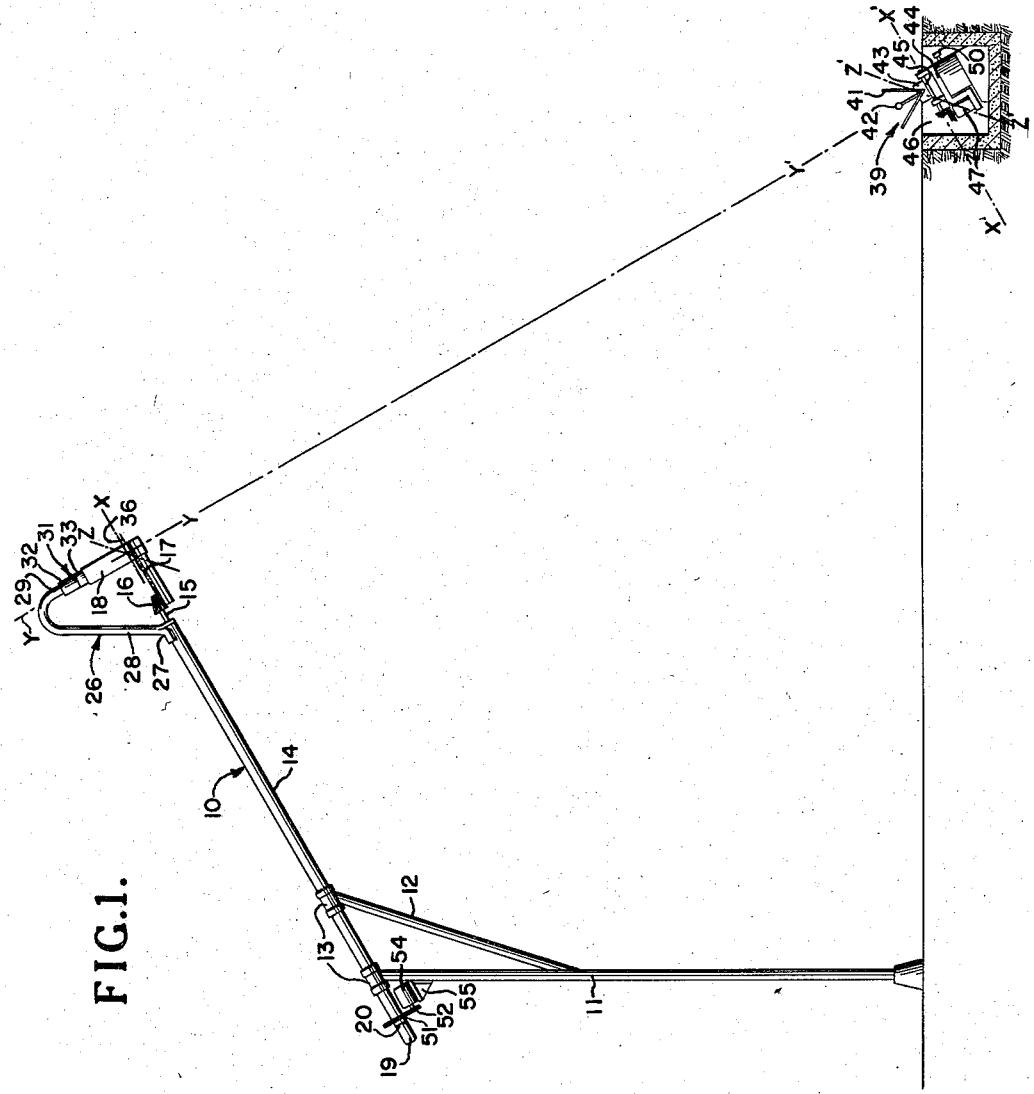
Fig. 1 is an elevational view of the device of the present invention constructed in accordance with a preferred embodiment thereof.
Figure 7:
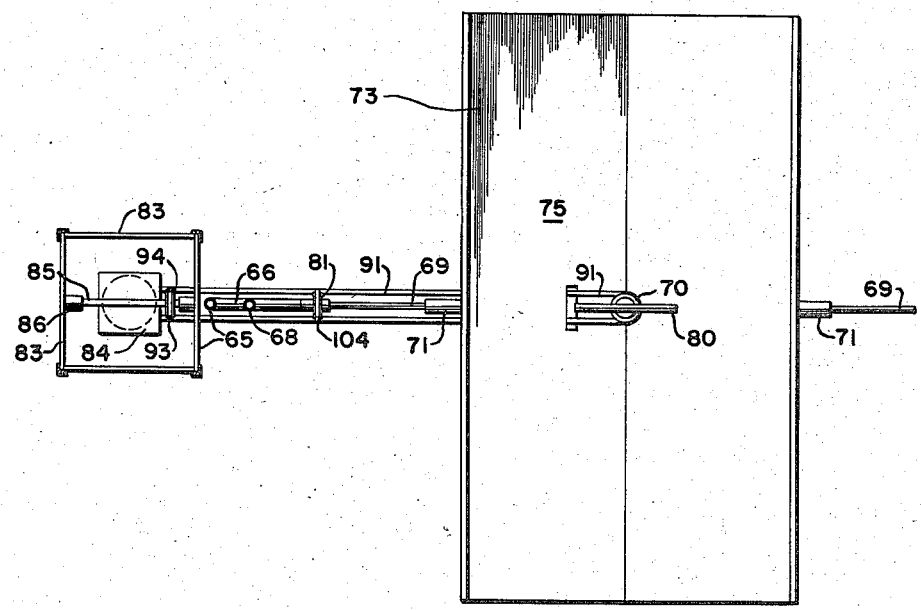
Fig. 7 is a sectional view taken on the line 7—7 of Fig. 6.

Referring now to the drawings and more particularly to Fig. 1, the new and improved antenna measuring range is generally indicated by the numeral 10 and comprises a standard or support 11 having a branch arm 12 carried thereby and a pair of bearings 13 for rotatably supporting a sleeve 14. A shaft 15 is disposed within and rotatably supported by sleeve 14, one end of the shaft having secured thereto a pinion 16 in meshing engagement with a semi-circular or segmental rack gear 17 carried by a semi-circular support 18 disposed at a right angle with respect to the rack 17, the other end of the shaft being connected to a motor 19 secured to the end of the sleeve 14 in any suitable manner such, for example, as by bolts 20. The motor is adapted to be a reversible type whereupon the shaft 15 may be rotated in either one direction or the other direction thereby to move the rack selectively about an axis Y—Y.

A tubular support generally indicated by the reference character 26 is secured to the outer end of the sleeve 14 as at 27, and comprises an arm 28 extending upwardly from the sleeve 14 and an arm 29 carried thereby and extending downwardly therefrom in a direction to intersect the axis of the sleeve. The arm 29 has mounted thereon a conventional rotary connector 31 having a member 32 secured thereto and a complementary member 33 secured to the support and rotatably mounted in member 32 as shown. The member 33 is provided with a tubular element 34 having a suitable connector 35 arranged therein for supporting the antenna 36 under test. The sleeve 14 is provided with a bore 37, Fig. 2, having arranged therein a R.-F. feeder line 38, the line extending through the tubular arms 28—29, rotary device 31, tubular element 34 and thence to connector 35 whereupon high radio frequency energy is supplied to the antenna under test at the required frequency from a conventional oscillator [not shown].

Figure 5:
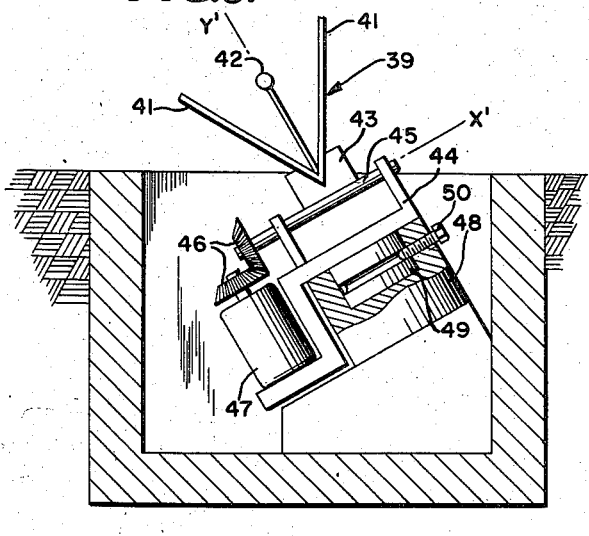
Fig. 5 is a detail view of the corner reflector, partially broken away and partially in section.

As more clearly shown on Figs. 1 and 5 a substantially V-shaped 60° corner reflector generally indicated by the reference character 39 is disposed beneath the antenna 36 under test and comprises a pair of mutually spaced inclined shields 41 having a conventional dipole antenna 42 disposed therebetween and secured thereto. The reflector is mounted on a support 43 pivotally mounted on a base 44 by a shaft 45 and adapted to be rotated by gears 46 driven by a motor 47 whereby the reflector may be rotated about an inclined axis X' parallel to sleeve 14, if desired, the support 44 being rotatably supported in a member 48 as at 49 whereby the reflector may be rotated about an axis Y' in alignment with the axis of rotation Y—Y of antenna 36. It will be understood that by the aforesaid arrangement, the antenna 42 may be moved into alignment with the antenna 36 under test. After the initial installation of the reflector and alignment of the antennas 36—42, the support 44 if desired may be locked to member 48 by a set screw 50 thereby to prevent further rotation of the support 44 and thus maintain the antennas 36—42 in the proper relation with respect to each other with axis Z parallel to axis Z'; namely the Y—Z plane. Furthermore, by this arrangement, if desired, the reflector may be rotated about the Y' axis and X' axis independently.

It will be noted on Figs. 1 and 2 that the sleeve 14 is rotatably supported in bearings 13 and adapted to be rotated by a gear 51 secured thereto and in engagement with a gear 52, carried by a shaft 53, driven by a motor 54, secured to bracket 55 and carried by the standard 11. By this arrangement it will be apparent that the antenna under test may be moved about the X axis, however, movement thereof about the Y axis is obtained by the aforesaid pinion and rack gear arrangement. For example, to obtain angular movement of the antenna 36 about axis Y—Y, motor 19 is set in operation to drive pinion 16 thereby to move rack 17 in the desired direction about the Y axis, and to obtain angular movement of the antenna 36 about the X axis the motor 54 is set in operation to rotate sleeve 14 through gears 51—52 in the desired direction.

It will be understood, however, that the center of rotation of the antenna 36 under test is the point of intersection of three mutually perpendicular axes X, Y and Z and is optically aligned with the center of the aforesaid shielded antenna 42 positioned near the ground and substantially 60 feet from the antenna or model under test, as the case may be, Fig. 1, and the reflector and antenna 42 may be, if desired, rotated as a unit about the Y' axis and X' axis independently.

Operation of the device for obtaining the various pattern measurements necessary during an antenna testing operation may be accomplished in the following manner: by rotating the sleeve about the X axis and thereafter rotating the antenna 36 in a plane perpendicular to the Y axis, by orienting the antenna 36 in the Y—Z plane and thereafter rotating the antenna 36 in the Y—Z by reason of the rotary sleeve structure 14 or by rotating the sleeve 14 and the receiving antenna 42 synchronously to a point such that the X—Z plane and the X'—Z' plane are kept parallel and thereafter, rotating the test antenna 36 about the Y axis by means of motor 19, pinion 16 and gear 17.

In regard to the pattern for rotation of the test antenna 36 about the major axis, it will be understood that the major axis of the antenna 36 coincides with the Z axis whereupon the antenna 36 is rotated about the Y axis for various degrees of tilt of the X—Z plane and corresponding degrees of tilt of the X'—Z' plane from the horizontal. The Y axis, however, remains perpendicular to the X'—Z' plane and the R.-F. pick-up from the feeder cable remains at a minimum.

In regard to the patterns in the X—Z plane, the pick-up at this time also remains at a minimum. In regard to the patterns in the Y—Z plane, however, the pick-up from the cable approaches a maximum as the cable approaches a position parallel to the Z' axis. When the cable is parallel with the Z' axis, however, the antenna 36 under test is perpendicular to the antenna 42 arranged within the reflector and there is substantially no radiation received from the antenna 42, assuming an equivalent dipole. Thus when this occurs the maximum R.-F. radiation from the cable could be measured and the pattern could be corrected. Furthermore, for other angular positions in the Y—Z plane, the contribution of the pick-up from the R.-F. feeder cable could be determined by rotating the axis of the antenna 36 under test such that it lies along the X axis. When this occurs the antenna 36 would assume a position perpendicular to the Z' axis, and thus assuming an equivalent dipole, the received radiation would be null whereupon the R.-F. pick-up from the cable, if present, could be made manifest.

Figure 6:
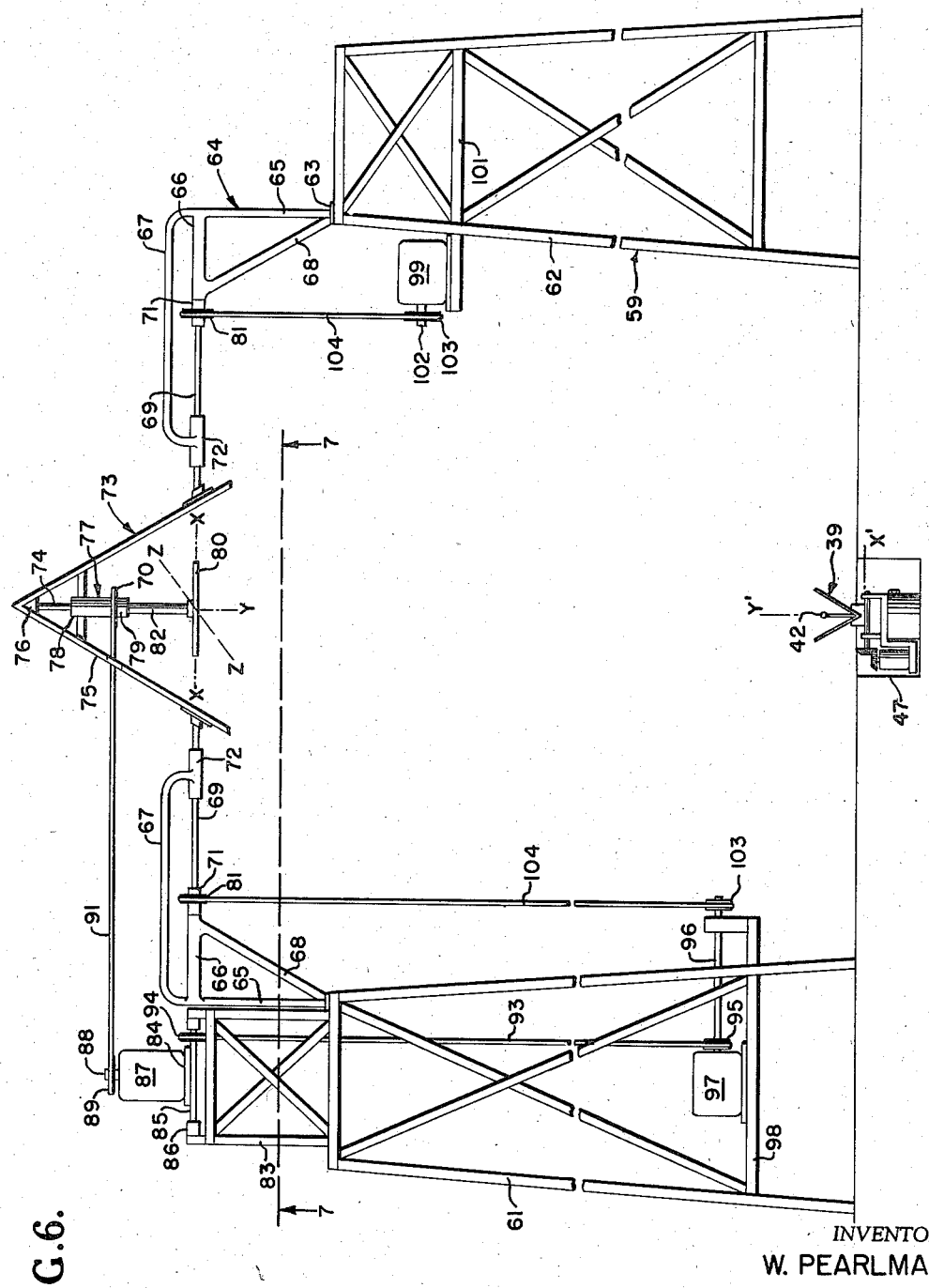
Fig. 6 is an elevational view of an alternative arrangement of the device of Fig. 1.

Referring now to the arrangement illustrated on Fig. 6 of the drawings, the numeral 59 generally indicates the antenna testing range comprising a pair of mutually spaced towers 61—62. Mounted on each of the towers and secured thereto as at 63 is a superstructure 64, each of the structures comprising a member 65 having a pair of mutually spaced arms 66—67 and a brace member 68. A pair of shafts 69 are rotatably supported on each of the superstructures by a rotary joint 71 and a bearing 72 carried by arms 66—67 respectively, the shafts 69 having disposed therebetween and secured thereto a reflector 73. A tubular support 74 is disposed centrally between the inclined shields 75 of the reflector and secured thereto as at 76, the tubular support carrying a rotary device 77, having a member 78 fixed thereto, and a member 79 rotatably supported thereby and provided with a pulley 70. The member 79 carries a tubular shaft 82 for supporting an antenna 80 during a testing operation whereby the antenna may be rotated about a vertical axis.

Disposed on the tower 61 and secured thereto in any suitable manner is a support 83 having a platform 84 carried by a shaft 85 pivotally mounted on the support 83 as at 86 whereby the platform may be rotated about a horizontal axis. A reversible motor 87 is secured to the movable platform and provided with a shaft 88 having a pulley 89 mounted thereon. A belt 91 is trained about pulleys 70 and 89 for rotating the antenna 80 under test about a vertical axis as the motor 87 is set in operation. Movement of the platform 84 and the motor 87 about the shaft 85 is provided by a belt 93 trained over a pulley 94 secured to shaft 85 and a pulley 95 secured to shaft 96 operated by a reversible motor 97 mounted on a support 98 carried by tower 61.

A reversible motor 99 is mounted on a support 101 mounted on the tower 62 and is provided with a shaft 102, motors 97 and 99 being synchronized thereby to operate at the same rate of speed and coincidently. Each motor shaft 96—102 is provided with a pulley 103, the driving connection therebetween and the pulleys 81 on the rotary member 79 being accomplished by belts 104 whereupon the shafts 69 are moved at the same rate of speed and the antenna under test is rotated about a horizontal axis. Moreover, by the aforesaid synchronous motor arrangement the platform 84 and motor 87 will be rotated proportionally to the rotation of the shafts 69 by reasons of the pivoted shaft 85 and the driving connection between motor 97 and shaft 85. Shafts 69 and the shaft 85 carrying motor 87 on platform 84 are rotatable only through an angle corresponding to less than one half a turn.

In this arrangement the R.-F. feed cable extends through support 65, one of the arms 66, rotary device 77, one of the shafts 69, along one of the inclined shields 75, tubular support 76 and thence to the antenna under test by way of rotary device 77 and antenna support 82. The corner reflector in this arrangement is identical to the reflector 39 and may be rotated about the axis of shafts 69 thereby to provide proper alignment of the dipole or receiving antenna 42 carried thereby with the antenna 80 under test and to provide proper angular relation between the antennas whereby certain pattern measurements may be made manifest. It will be understood that in this arrangement the motor 47 may be synchronized with motors 97—99 to cause the antennas 39—80 to be rotated about their respective horizontal axes at the same rate of speed. Moreover, the pivoted platform 84 and motor 87 are adapted to be rotated proportionally to the rotation of the aforesaid antennas by the synchronous motor arrangement.

From the foregoing, it will be apparent that a new and improved antenna testing range has been devised wherein the antenna under test may be moved to various selected positions whereby the pattern measurements of an antenna under test operating in a very high frequency range may be made manifest and in which means are provided for reducing the R.-F. pick-up from the feed line, for reducing spurious reflections to a minimum and for eliminating ground reflections.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a testing device for a VHF antenna, a support, sleeve means carried by and rotatably mounted on said support, an arm carried by said sleeve means, rotatable means mounted on said arm for supporting said VHF antenna during a testing operation, means operatively connected to said rotatable means for rotating the rotatable means whereby said antenna is moved about an axis, means operatively connected to said sleeve means for rotating the sleeve whereby the antenna is rotated about an axis normal to the first named axis, means connected to said antenna for applying very high frequency energy thereto, means for receiving signals from said antenna under test whereby the pattern measurements thereof may be made manifest as the antenna is moved about said axes, and means operatively connected to said signal receiving means for aligning the receiving means with said antenna under test.

2. In a testing device for a VHF antenna, a support, sleeve means carried by and rotatably mounted on said support, bearing means carried by said support for rotatably mounting the sleeve means on the support, an arm carried by said sleeve means, means including a rack bar rotatably mounted on said arm, means carried by said rack bar and movable therewith for supporting a transmitting antenna during a testing operation, means operatively connected to said rack bar for rotating said rack bar whereby the antenna is moved rotatably about first axis, means operatively connected to said sleeve for rotating the sleeve whereby said antenna is moved rotatably about a second axis normal to said first axis, means connected to said antenna for applying very high radio frequency energy thereto, means including a receiving antenna for receiving signals from said transmitting antenna under test whereby the pattern measurements thereof may be made manifest as the transmitting antenna is rotated about said axes, and means operatively connected to said receiving antenna for rotating the receiving antenna about a pair of mutually normal axes in predetermined spaced relation to said first and second axes.

3. In a testing device for a VHF transmitting antenna, a support, a sleeve carried by and rotatably mounted on said support, an arm secured to said sleeve, means including a rack bar rotatably supported on said arm, means carried by said rack bar for supporting a transmitting antenna during a testing operation, means including a pinion in engagement with said rack bar for rotating said rack bar whereby said transmitting antenna is rotated about an axis, drive means operatively connected to said sleeve for rotating said sleeve whereby said antenna is rotated about a second axis normal to said first named axis, means connected to the antenna for supplying very high frequency energy thereto, means for receiving signals from the transmitting antenna under test whereby the pattern measurements thereof may be made manifest as the antenna is rotated about said axes, means including a motor operatively connected to said receiving means for rotating said receiving means whereby the receiving means is rotated about an axis in alignment with said first named axis, and means including a shaft carried by said receiving means whereby said receiving means is rotated about a second axis normal to the first named axis of said receiving means.

4. In a testing device for a VHF antenna, a support, a sleeve rotatably mounted on said support, bearing means carried by said support for rotatably mounting said sleeve on said support, an arm carried by said support, means including a segmental toothed rack rotatably supported on said arm, journal means carried by said rack and disposed within said arm for rotatably supporting the rack, means carried by said journal means for supporting the antenna during a testing operation, means including a pinion in engagement with said rack for rotation of said rack whereby the antenna is rotated about an axis, gear means connected to said sleeve for rotating the sleeve whereby the antenna is rotated about a second axis normal to said first named axis, a motor for driving said gear means, means connected to said antenna for applying very high frequency energy thereto, means including a receiving antenna for receiving signals from said VHF antenna whereby the pattern measurements thereof may be made manifest as the VHF antenna is moved about said axes, and means in synchronism with the motor for rotating said receiving means proportionally to the degree of rotation of the VHF antenna under test when said VHF antenna is moved about said second axis.

5. In a testing device for a VHF transmitting antenna, a support, a sleeve carried by and rotatably mounted on said support, bearing means carried by said support for rotatably mounting said sleeve on the support, an arm carried by said sleeve and having a bearing formed therein, means including a segmental toothed rack journaled in said bearing, a tubular member carried by said rack for supporting said transmitting antenna during a testing operation, means including a pinion in engagement with said rack for moving the rack whereby the transmitting antenna is rotated about an axis, driving means for said pinion, motor means including a gear secured to said sleeve for rotating the sleeve whereby said transmitting antenna is rotated about a second axis normal to said first named axis, means connected to the transmitting antenna for supplying ultra high radio frequency energy thereto, a receiving antenna for receiving signals from said transmitting antenna whereby the pattern measurements of the transmitting antenna may be made manifest as the transmitting antenna is rotated about said axes, a base member, means carried by said base member for rotatably supporting the receiving antenna for movement about an axis parallel to the first named axis, means carried by said rotatably supporting means for pivotally mounting the receiving antenna thereon, and means including a motor connected to said pivotally mounting means and in synchronism with said motor means for rotating the receiving antenna proportionally to the rotation of the transmitting antenna when the transmitting antenna is rotated about said second axis.

6. In a testing device for a radar antenna, a support, a sleeve carried by and rotatably mounted on said support, bearing means carried by said support for rotatably mounting said sleeve on the support, an arm carried by said sleeve and having a bearing formed therein, means including a segmental toothed rack journaled in said bearing, a tubular member carried by said rack for supporting a transmitting antenna during a testing operation, means including a pinion in engagement with said rack for moving the rack whereby the antenna is rotated about a first axis, driving means for said pinion, motor means including a gear secured to said sleeve for rotating the sleeve whereby said transmitting antenna is rotated about a second axis normal to said first axis, means connected to the transmitting antenna whereby ultra high radio frequency energy is applied thereto, a rotatable reflector, a receiving antenna mounted in said reflector for receiving signals from said transmitting antenna whereby the pattern measurements thereof may be made manifest as the transmitting antenna is rotated about said axes, a base member, a plate rotatably supported by said base, a platform pivotally mounted on said plate for supporting said reflector, means including a motor operatively connected to said platform in synchronism with said motor means for rotating the reflector and receiving antenna proportionally to the rotation of the transmitting antenna as the transmitting antenna is rotated about said second axis, and means for rotatably supporting said plate on said base member whereby said reflector and transmitting antenna may be rotated about an axis parallel to said first axis.

7. In a testing device for antennas, a pair of supports, a pair of shafts rotatably mounted on said supports respectively, a shielded transmitting antenna disposed centrally between and secured to said shafts, means including a pair of synchronous motors for rotating said transmitting antenna about a first axis, means including a motor pivotally mounted on one of the supports for rotating said transmitting antenna about a second axis normal to said first axis, means controlled by one of said synchronous motors for moving said pivotally mounted motor proportionally to the rotation of said transmitting antenna when said antenna is moved about said first axis, means connected to said antenna for applying very high frequency energy thereto, means including a shielded receiving antenna for receiving signals from said transmitting antenna whereby the operating characteristics and pattern measurements of the transmitting antenna may be made manifest, means including a rotary member carried by said receiving antenna for rotating the receiving antenna about an axis parallel to said first axis, and means including an additional motor in synchronism with said pair of motors for rotating said receiving antenna proportionally to the degree of rotation of said transmitting antenna when said transmitting antenna is rotated about said first named axis.

8. In a testing device of the character disclosed, a pair of supports, a pair of standards mounted on said supports respectively, a pair of bearing members carried by each of said standards, a pair of shafts rotatably mounted in a pair of said bearings respectively, a reflector disposed between and secured to said shafts, a transmitting antenna rotatably arranged with said reflector, a rotary member for said transmitting antenna, means including a pair of synchronous motors connected to said shafts respectively for rotating said shafts whereby the reflector and the transmitting antenna are rotated about a vertical axis, a platform pivotally mounted on one of said supports, a motor mounted on said platform, means controlled by said motor for rotating said rotary member whereby said transmitting antenna is rotated about a horizontal axis, means connected to said platform and controlled by one of said synchronous motors for moving said platform and motor proportionally to the degree of rotation of the transmitting antenna as the transmitting antenna is rotated about said vertical axis, and means connected to said transmitting antenna for applying very high frequency thereto.

9. In a testing device of the character disclosed, a pair of supports, a pair of standards mounted on said supports respectively, a pair of bearings carried by each of said standards, a pair of shafts rotatably mounted in a pair of said bearings respectively, a reflector having a pair of inclined shields disposed between and secured to said shafts, a transmitting antenna disposed between said shields, a rotary member carried by said reflector for rotatably supporting said transmitting antenna between said shields, a pair of synchronous motors, driving means connected to said synchronous motors and the shafts respectively for rotating said shafts whereby the reflector and transmitting antenna is rotated about a vertical axis, a platform rotatably mounted on one of said supports, means including a rod for rotatably mounting said platform on one of said supports, a motor mounted on said platform, driving means controlled by said motor and connected to said rod for rotating said rotary member whereby said transmitting antenna is rotated about a horizontal axis, a driving connection between said rod and one of said synchronous motors for rotating said rod whereby said motor and platform are moved proportionally to the degree of movement of the transmitting antenna as the transmitting antenna is rotated about said vertical axis, means connected to said transmitting antenna whereby ultra-high frequency may be supplied thereto, a reflector including a receiving antenna for receiving signals from the transmitting antenna whereby the pattern measurements thereof may be made manifest as the transmitting antenna is moved about said horizontal and vertical axes, a base member, means for rotatably supporting said reflector and said base member, and means controlled by said pair of synchronous motors and connected to said rotatable support for rotating said reflector and receiving antenna proportionally to said transmitting antenna as said transmitting antenna is rotated about said vertical axis.

References Cited in the file of this patent
UNITED STATES PATENTS
2,602,924   Schmitt et al. _____ July 8, 1952